United States Patent
Kim et al.

(10) Patent No.: US 12,327,039 B2
(45) Date of Patent: Jun. 10, 2025

(54) METHOD FOR CONTROLLING CLOCK OF CONTROLLER AND STORAGE SYSTEM

(71) Applicant: SAMSUNG ELECTRONICS CO., LTD., Suwon-si (KR)

(72) Inventors: Kwanhyo Kim, Suwon-si (KR); Taec-Jun Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/225,980

(22) Filed: Jul. 25, 2023

(65) Prior Publication Data

US 2024/0248636 A1 Jul. 25, 2024

(30) Foreign Application Priority Data

Jan. 19, 2023 (KR) .................. 10-2023-0008085

(51) Int. Cl.
*G06F 1/32* (2019.01)
*G06F 3/06* (2006.01)
*G06F 1/3203* (2019.01)

(52) U.S. Cl.
CPC .......... *G06F 3/0655* (2013.01); *G06F 3/0604* (2013.01); *G06F 3/0679* (2013.01); *G06F 1/3203* (2013.01)

(58) Field of Classification Search
CPC .... G06F 3/0655; G06F 3/0604; G06F 3/0679; G06F 3/0625; G06F 3/0634; G06F 1/3237; G06F 1/324; G06F 1/3275; Y02D 10/00
USPC ....................................... 713/322
See application file for complete search history.

(56) References Cited

U.S. PATENT DOCUMENTS

| | | | |
|---|---|---|---|
| 6,845,418 B2 * | 1/2005 | Kim ...................... | G06F 13/423 710/118 |
| 7,003,309 B2 | 2/2006 | Suzuki et al. | |
| 7,657,689 B1 * | 2/2010 | Crosland .............. | G06F 13/405 710/305 |
| 8,799,699 B2 | 8/2014 | Hashimoto | |
| 9,442,668 B1 | 9/2016 | Adams | |
| 10,747,297 B2 * | 8/2020 | Yoon ...................... | G06F 1/324 |
| 11,086,388 B2 * | 8/2021 | Kang .................... | G06F 1/3225 |
| 11,314,278 B2 | 4/2022 | Jeon et al. | |
| 11,397,460 B2 * | 7/2022 | Yang ...................... | G11C 16/26 |
| 11,867,744 B2 * | 1/2024 | Khare ............. | G01R 31/318328 |
| 2002/0019895 A1 * | 2/2002 | Kim ...................... | G06F 13/423 710/100 |
| 2002/0019900 A1 * | 2/2002 | Kim ...................... | G06F 13/362 710/240 |
| 2002/0183092 A1 * | 12/2002 | Suzuki ................. | G06F 13/385 455/572 |
| 2010/0325342 A1 * | 12/2010 | Honda ................ | G06F 12/0607 711/E12.008 |

(Continued)

*Primary Examiner* — Volvick Derose
(74) *Attorney, Agent, or Firm* — Sughrue Mion, PLLC

(57) ABSTRACT

A controller of a storage system, includes a plurality of modules each including an intellectual property (IP) module and a core module, wherein, based on the IP module operating as a master for a first module of the plurality of modules, an idle clock of the first module is a first clock, wherein based on the core module operating as a master for a second module of the plurality of modules, an idle clock of the second module is a second clock, wherein a clock frequency of the first clock is greater than zero and smaller than a maximum clock frequency, and wherein a clock frequency of the second clock is zero.

18 Claims, 6 Drawing Sheets

(56) References Cited

U.S. PATENT DOCUMENTS

| | | | |
|---|---|---|---|
| 2011/0314197 A1* | 12/2011 | Hashimoto | G06F 1/3237 |
| | | | 710/110 |
| 2012/0005516 A1* | 1/2012 | Bergmann | G06F 1/3237 |
| | | | 713/375 |
| 2015/0081973 A1* | 3/2015 | Shachar | G06F 12/0638 |
| | | | 711/117 |
| 2015/0363116 A1 | 12/2015 | Govindan et al. | |
| 2017/0220495 A1* | 8/2017 | Jeon | G06F 13/1689 |
| 2017/0277471 A1* | 9/2017 | Huang | G06F 3/0685 |
| 2021/0223847 A1* | 7/2021 | Jung | G06F 1/3243 |
| 2021/0271418 A1* | 9/2021 | Su | G06F 3/0635 |
| 2022/0011965 A1 | 1/2022 | Heller et al. | |
| 2022/0179822 A1* | 6/2022 | Soulie | G06F 1/3237 |
| 2024/0211169 A1* | 6/2024 | Ahn | G06F 3/0607 |

\* cited by examiner

METHOD FOR CONTROLLING CLOCK OF CONTROLLER AND STORAGE SYSTEM

CROSS-REFERENCE TO RELATED APPLICATION

This application claims priority to and the benefit of Korean Patent Application No. 10-2023-0008085 filed in the Korean Intellectual Property Office on Jan. 19, 2023, the entire contents of which are incorporated herein by reference.

BACKGROUND

1. Field

The present disclosure relates to a method for controlling a clock of a controller and a storage system.

2. Description of Related Art

With the need for high computer power and large storage capacities increasing, high-performance and high-capacity solid state drives (SSD) are becoming more necessary. However, high-performance and high-capacity solid state drives consume a large amount of power. Accordingly, the need for power saving technology and power management optimization is increasing. Currently, a technology related to power management when a host system is in an idle state is being researched. However, these methods do not optimize power consumption of the solid state device.

SUMMARY

One or more embodiments provides a controller of a storage system.

Another embodiment provides a storage system.

Another embodiment provides a method for controlling a clock of a slave module of a storage system.

According to one or more embodiments, a controller of a storage system, comprising a plurality of modules each including an intellectual property (IP) module and a core module, wherein, based on the IP module operating as a master for a first module of the plurality of modules, an idle clock of the first module is a first clock, wherein based on the core module operating as a master for a second module of the plurality of modules, an idle clock of the second module is a second clock, wherein a clock frequency of the first clock is greater than zero and smaller than a maximum clock frequency, and wherein a clock frequency of the second clock is zero.

According to one or more embodiments, a storage system comprises a controller; and a plurality of memory devices, wherein the controller is configured to control the plurality of memory devices according to a service request from a host system, and the controller is further configured, upon converting a plurality of modules in a first flash group of a plurality of flash groups each mapped to a respective memory device of the plurality of memory devices to an idle state, to change a first idle clock of a first module and a second idle clock of the second module of the plurality of modules to different clock levels.

According to one or more embodiments, a method for controlling a clock of a slave module of a storage system, comprises: checking a memory in the storage system to determine whether the memory includes a command that needs to be processed; and supplying a respective idle clock to each slave module of a plurality of slave modules based upon a determination there is no command that needs to be processed in the memory, each idle clock having a different clock frequency, wherein the clock frequencies of the idle clocks is greater than zero and smaller than a maximum clock frequency.

By independently controlling a clock level of a module in a controller, it is possible to provide an SSD that may minimize power consumption and support the same performance with low power.

DETAILED DESCRIPTION OF EMBODIMENTS

Figure 1:
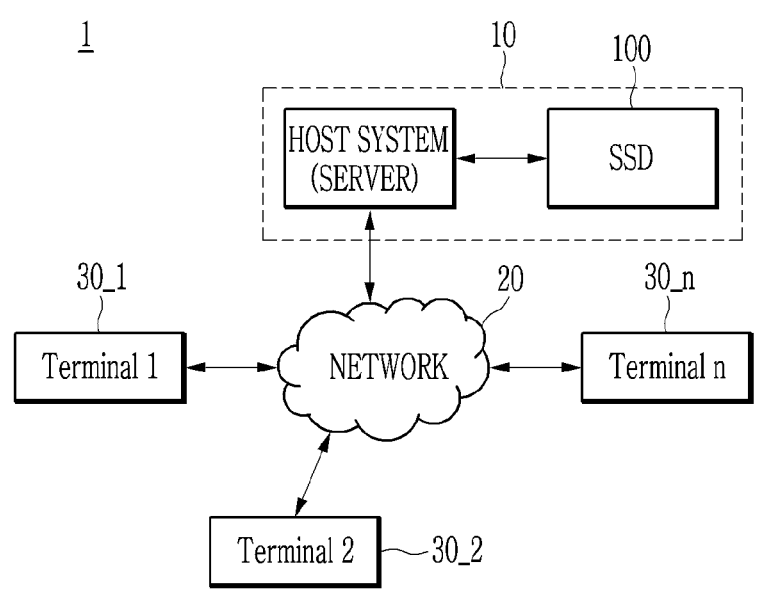
FIG. 1 illustrates a block diagram of a network system according to one or more embodiments.

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

Accordingly, the drawings and description are to be regarded as illustrative in nature and not restrictive. Like reference numerals designate like elements throughout the specification. In the flowcharts described with reference to the drawings in this specification, the operation order may be changed, various operations may be merged, certain operations may be divided, and certain operations may not be performed.

In addition, a singular form may be intended to include a plural form as well, unless an explicit expression such as "one" or "single" is used. Terms including ordinal numbers such as first, second, and the like will be used only to describe various constituent elements, and are not to be interpreted as limiting these constituent elements. These terms may be used for a purpose of distinguishing one constituent element from other constituent elements.

The embodiments described herein are example embodiments, and thus, the disclosure is not limited thereto and may be realized in various other forms. It will be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present. Spatially relative terms, such as "over," "above," "on," "upper," "below," "under," "beneath," "lower," "left," "right," and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

FIG. 1 illustrates a block diagram of a network system according to one or more embodiments.

Referring to FIG. 1, a network system 1 according to one or more embodiments may include a computing device 10 and at least one terminal (e.g., a computing node) 30_1 to 30_n communicating through a network 20. The computing device 10 may be implemented by using a data processing system according to the above-described embodiments.

The computing device 10 may include a host system and a storage system. The host system may perform a function of a server or any other suitable computing device, and the storage system may be a flash memory device (e.g., a NAND flash memory device), or any other suitable memory structure. In one or more embodiments, the flash memory device may include a solid state drive (SSD) 100.

The host system may process a request transmitted from the plurality of terminals 30_1 to 30_n connected to the network 20. The network 20 may be any suitable network such as the Internet. In one or more embodiments, the host system may store data provided from the plurality of terminals 30_1 to 30_n in the SSD 100, and may transmit the data stored in the SSD 100 to the plurality of terminals 30_1 to 30_n.

Figure 2:
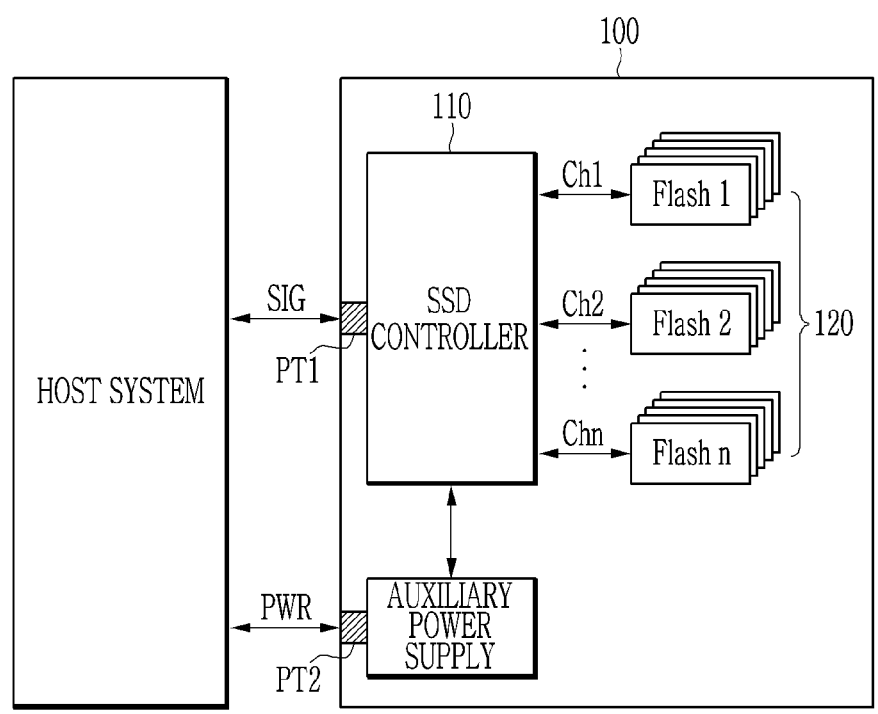
FIG. 2 illustrates a block diagram of a computing device according to one or more embodiments.

FIG. 2 illustrates a block diagram of a computing device according to one or more embodiments.

Referring to FIG. 2, a computing device may include a host system and a storage system. The host system and the storage system may communicate through an interface. The interface may be a physical interface or a wireless interface. The storage system may be the SSD 100, and the SSD 100 may include a controller 110 and at least one memory device 120.

The controller 110 may control the memory device 120 in response to a signal SIG received from the host system through a first port PT1 of the SSD 100. The controller 110 may be connected to the memory device 120 through a plurality of channels Ch1 to Chn. The SSD 100 may output a result SIG of processing a service request of a host system HOST through the first port PT1.

The SSD 100 may further include an auxiliary power supply, and the auxiliary power supply may receive power PWR from the host device HOST through a second port PT2. In one or more examples, the SSD 100 may receive power from an external device other than the host device HOST.

In one or more examples, the controller 110 may control a memory operation of the memory device 120 by providing a signal to the memory device 120 in response to a request from the host system. A signal can include an instruction and an address. The controller 110 may read data stored in the memory device 120 by providing a read signal to the memory device 120. In one or more examples, the controller 110 may write data into the memory device 120 by providing a write signal and data to the memory device 120.

In some embodiments, the memory device 120 may include a volatile memory such as a dynamic random-access memory (DRAM). In some embodiments, the memory device 120 may include a non-volatile memory such as a flash memory, a phase-change memory, a resistive memory, a magnetoresistive memory, a ferroelectric memory, or a polymer memory. In some embodiments, the memory device 120 may be used as a system memory of the host system. In this case, the controller 110 may be provided as a separate chip from the processor of the host system, or may be provided as an internal component of the processor. In some embodiments, the storage system may be used as a storage device of the host system.

Figure 3:
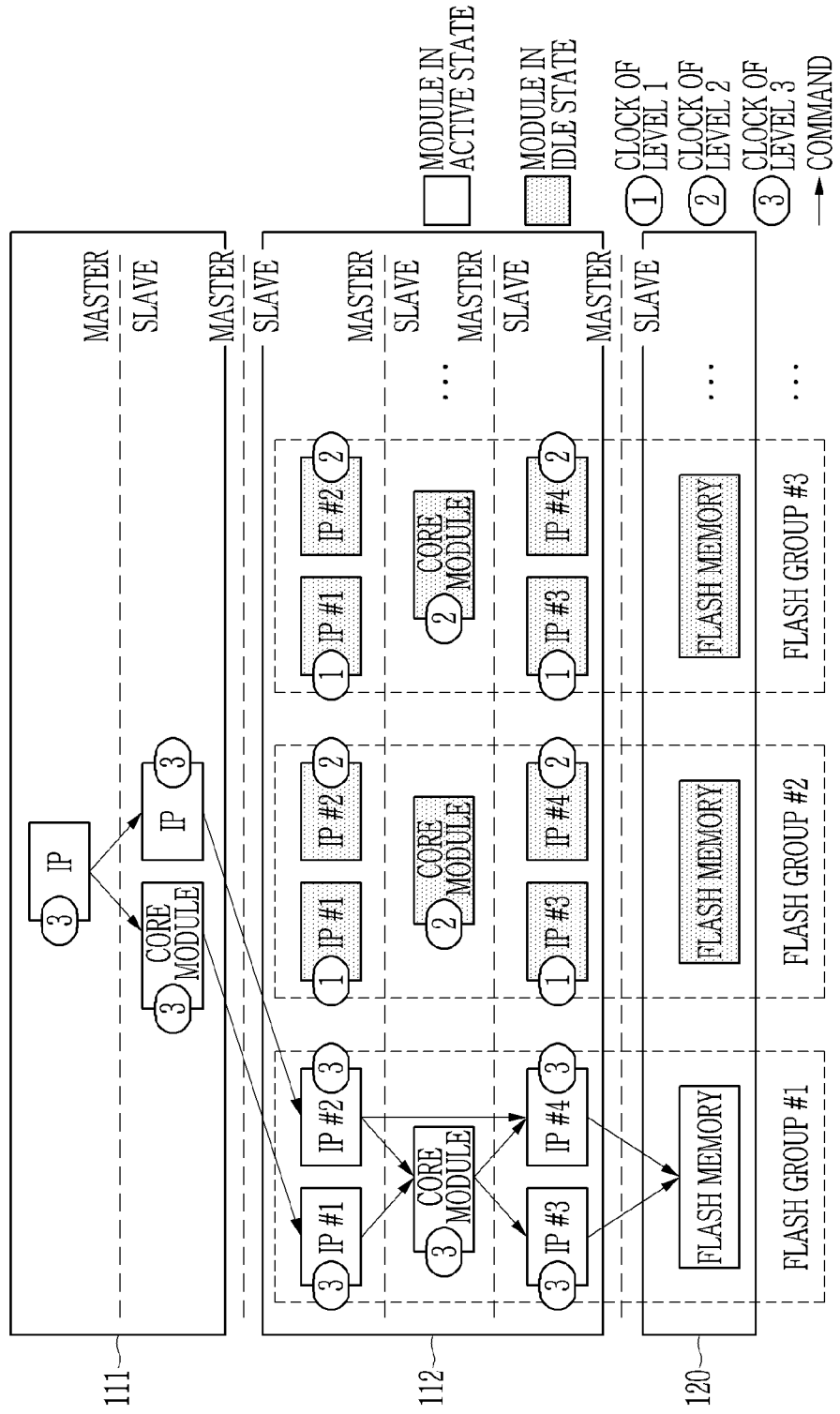
FIG. 3 illustrates a controller of a storage system according to one or more embodiments.

FIG. 3 illustrates a controller of a storage system according to one or more embodiments.

Referring to FIG. 3, the controller 110 of the storage system may include a host interface 111 and a flash interface 112. In one or more embodiments, the host interface 111 and the flash interface 112 may each include a plurality of modules. In one or more examples, each module may be a core module or an intellectual property (IP) module.

In one or more examples, the host interface 111 may receive a service request from the host system, and may transmit a command for the received service request to the flash interface 112. The service request may correspond to the retrieval of information, the storage of information, etc. The flash interface 112 may process a command from the host interface 111 to perform a request (read or write) for the memory device 120 mapped to a service request.

In one or more embodiments, the core module and the IP module in the host interface 111 and the flash interface 112 may operate in a master-slave architecture. Referring to FIG. 3, an upper module disposed relatively higher in the host interface 111 and the flash interface 112 may operate as a master with respect to a lower module disposed relatively lower, and the lower module may operate as a slave of the upper module. For example, the core module and the IP module in the host interface may operate as masters with respect to the module in the flash interface, and the core module and the IP module in the flash interface may operate as slaves with respect to each module in the host interface. In one or more embodiments, the master of the host interface 111 and the flash interface 112 may transmit a command according to a service request of the host system to the slave. The core module and the IP module of the host interface 111 may function as a supervisor of a master-slave structure. In one or more examples, one or more modules may be arranged according to a hierarchical relationship where a first module that is referred to being higher or lower than a second module may refer to the hierarchical relationship between the first and second modules. For example, if the first module is higher than the second module, the first module may be higher in the hierarchical relationship than the second module.

In one or more embodiments, software may run on the core module, and a hardware logic may run on the IP module. The IP module may process operations performed in the storage system, such as read/write operations of data, and the core module may perform exception processing for major operations of the storage system. Referring to FIG. 3, an upper IP module in the host interface 111 may receive a service request from the host system, and may transmit a command for requesting a service to a lower core module or a lower IP module according to a type of the received service request.

For example, when the received service request is a data read operation, the higher IP module within the host interface 111 may transmit a command according to the service request to the lower IP module within the host interface 111. In one or more examples, the IP module is a hardware logic, which may improve performance of the storage system by quickly processing main operations of the storage system.

In one or more examples, when the upper IP module in the host interface 111 is performing a post-processing operation to solve a problem that occurred in the read or write operation of the received service request, the upper IP module may transmit a command according to the service request to the lower core module in the host interface 111. The core module is software logic for processing exceptions of the storage system, and may improve stability of the storage system by processing various exception operations occurring in the storage system.

In one or more embodiments, commands from the host system may be transmitted between respective modules in a layer of the flash interface. In FIG. 3, the flash interface may include three layers. However, as understood by one of ordinary skill in the art. The flash interface is not limited to these configurations, and may include any suitable number of layers.

In one or more examples, a first layer of the layers of the flash interface may receive a command from a module of the host interface, and transmit a command to a second layer of the flash interface. The last layer of the flash interface may transmit a command to the mapped memory device 120.

In the host interface and the flash interface, a module of a higher layer may transmit a command according to a service request to a module of a lower layer. For example, referring to FIG. 3, IP module #1 of the first layer of the flash interface may receive a command from the core module of the host interface, and IP module #2 may receive a command from the IP module of the host interface.

Referring to FIG. 3, each module of the host interface may function as a master for each module of the first layer of the flash interface, and each module of the first layer of the flash interface may function as a slave for each module of the host interface. In one or more examples, each module of the first layer of the flash interface may function as a master for each module of the second layer of the flash interface, and each module of the second layer of the flash interface may function as a slave for each module of the first layer of the flash interface. In one or more examples, each module of the second layer of the flash interface may function as a master for each module of the third layer of the flash interface, and each module of the third layer of the flash interface may function as a slave for each module of the second layer of the flash interface.

In the master-slave structure according to one or more embodiments, the master may transmit a command according to a service request to the slave. When the command according to the service request is received, the master of the master-slave structure may transmit the received command to the slave. When a clock of the slave is in an off state (e.g., when the slave may not process a command) and when a command is transmitted from the master to the slave, an erroneous operation such as a bus hang may occur or be detected in the storage system.

In one or more embodiments, when the slave's master controls the slave's clock, the master may wake up the slave such that the slave is active, and then may transmit a command to the active slave. Accordingly, even if an idle clock when the slave is in an idle state is a zero clock (e.g., slave clock is inactive), the slave may process a command from the slave's master. However, when the slave's master does not control the slave's clock, the slave may not process the command transmitted from the master while the clock is not supplied. Therefore, the slave's idle clock needs to disadvantageously be maintained at a non-zero level before a command is transmitted from the master, thereby unnecessarily increasing power consumption.

In one or more embodiments, the core module may control the slave's clock and the IP module does not control the slave's clock. For example, the core module may wake up the slave before transmitting a command to the slave. In one or more examples, a clock control function for the slave may be installed in the software logic of the core module. However, in one or more examples the IP module does not wake up an idle slave.

In one or more embodiments, the flash interface may independently operate in units of a flash group mapped to each memory device 120. The module of the host interface may read data from the memory device 120 or may write data to the memory device 120 by transmitting a command according to a service request to the flash group mapped to each memory device 120 as a supervisor. Accordingly, the controller 110 may selectively control a state of the flash group corresponding to the memory device 120.

In one or more embodiments, the controller 110 may convert a flash group corresponding to the memory device 120 related to the service request into an active state, and may maintain an idle state of a flash group unrelated to the service request. In one or more examples, the controller 110 may control an idle clock of a module in a flash group in an idle state to a low clock (e.g., clock with low frequency or duty cycle) or zero clock (e.g., clock that is off).

The controller 110, according to one or more embodiments, may manage the state of the module as active or idle. A module in an active state and a module in an idle state may be supplied with different levels of clocks. In one or more embodiments, the controller 110 may supply a level 3 clock (e.g., an active clock or a max clock) to a module in an active state, and may supply a level 2 clock (e.g., a low clock having a frequency or duty cycle lower than a level 3 clock) or a level 1 clock (e.g., a zero clock that is, clock off) to a module in an idle state.

In one or more embodiments, the controller 110 may wake up a module of the flash group (e.g., Flash Group #2 and/or Flash Group #3 in FIG. 3) in an idle state to convert the flash group to an active state according to a service request from the host system.

In one or more examples, the controller 110 may convert a state of each module in the flash group to an idle state according to a processing result of the service request from the host system. The level of the idle clock, when each module is in an idle state, may be predetermined according to a type of a master of each module.

In one or more embodiments, when a slave has only a core module as a master, an idle clock of a slave module may be level 1 (zero clock) because a slave having only a core module capable of waking up a slave module as a master may process a command transmitted from the master even when a clock is zero.

However, when the IP module is included in the master of each module, the level of the idle clock of the slave module may be a predetermined level greater than zero. In one or more embodiments, the idle clock of the slave module may be level 2. The clock of level 2 may be larger than the zero clock and smaller than a maximum clock (e.g., level 3). The maximum clock may have a clock frequency that is larger than the clock frequency of the clock associated with level 2. Since the IP module may not wake up the slave module even if there is a command to be transmitted to the lower slave, and when the IP module is included in the master module, the idle clock of the slave needs to be maintained at a clock level greater than zero for processing of a command that may be transmitted from the IP module. In one or more embodiments, level 2 may be a minimum level at which a slave may wake itself up without the master's wakeup (e.g., the level at which an idle state may be converted into an active state).

In one or more embodiments, level 2 may be determined as 1/n of a maximum clock frequency. A specific value of level 2 may be determined according to a power limit value of the SSD 100 in an idle state. For example, level 2 may be determined as a value in which power consumption by m slave modules having an IP module as a master and operating at level 2 does not exceed the power limit of the SSD 100 in an idle state. For example, when the power limit of the SSD 100 in an idle state is 5 W, level 2 may be 2.5% of the maximum clock (e.g., level 3).

In one or more embodiments, the levels of the idle clock of the module of each layer in the flash interface may be different. For example, referring to FIG. 3, among the modules in the first layer of the flash interface 112, the level of the idle clock of IP module #1 may be level 1, and the level of the idle clock of IP module #2 may be level 2. Since the master of IP module #1 is the core module of the host interface 111, the idle clock of IP module #1 may be a zero clock, and since the master of IP module #2 is the IP module of the host interface 111, the idle clock of IP module #2 may be a low clock. The core module of the host interface 111 may be the master of IP module #1 of each flash group, and the IP module of the host interface 111 may be the master of IP module #2 of each flash group.

In FIG. 3, since the module in flash group #1 is in an active state receiving and processing a command from the host interface 111, the clock of the module in flash group #1 may be at level 3. On the other hand, since flash group #2 and flash group #3 are in an idle state, the clocks of the modules in flash group #2 and flash group #3 may be at level 1 or level 2.

Since the masters of the core modules of the second layer are IP module #1 and IP module #2 of the first layer, the level of the idle clock of the core modules of the second layer may be level 2.

Since the master of IP module #3 of the third layer is the core module of the second layer, the level of the idle clock of IP module #3 in the third layer may be level 1. For example, since the core module of the second layer may wake up IP module #3 to transmit a command according to a service request to IP module #3, IP module #3 may operate with a zero clock in an idle state.

In FIG. 3, since the master of IP module #4 in the third layer is IP module #2 of the first layer and the core module of the second layer, the idle clock of IP module #4 in the third layer may be at level 2. Since IP module #4 may receive a command from an IP module of another path (that is, IP module #2 of the first layer) other than the core module of the second layer, and the IP module of the other path may not wake up IP module #4, the idle clock of IP module #4 may be at level 2 despite the core module of the second layer.

As described above, by independently controlling the clock levels of respective modules in the controller, it is possible to provide an SSD that may minimize power consumption and support the same performance with low power, thereby optimizing the power savings of the SSD.

Figure 4:
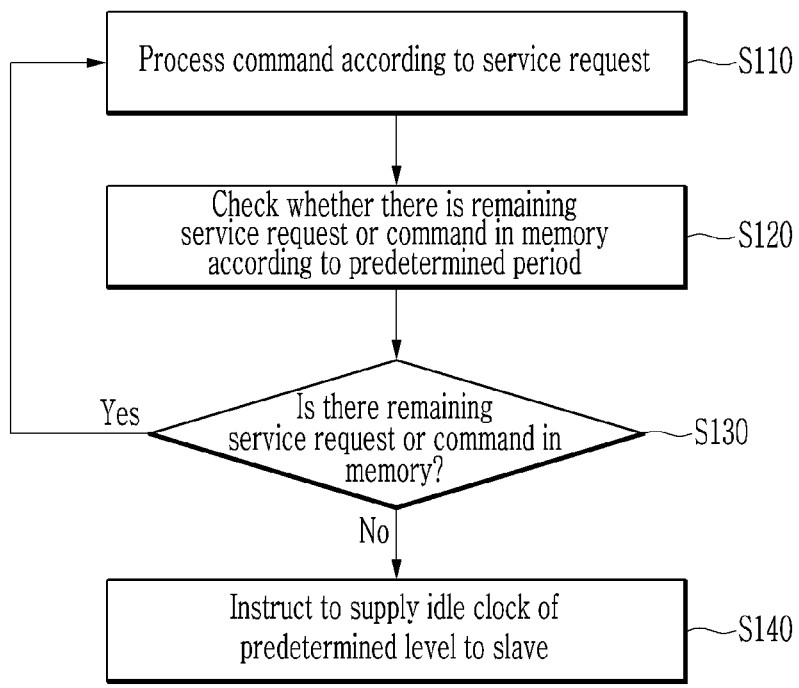
FIG. 4 illustrates a flowchart of a clock control method according to one or more embodiments.
Figure 5:
FIG. 5 illustrates a schematic view of a clock control method according to one or more embodiments.

FIG. 4 illustrates a flowchart of a clock control method according to one or more embodiments, and FIG. 5 illustrates a schematic view of a clock control method according to one or more embodiments.

In one or more embodiments, the core modules in the host interface 111 and the flash interface 112 may check the memory in the controller 110 and switch the state of the slave depending on whether there are remaining service requests or remaining commands.

In one or more embodiments, the core module may instruct the clock controller to switch the clock to be supplied to each slave to an idle clock when there are no remaining service requests or no remaining commands, and the clock controller may supply an idle clock of a predetermined level to each slave according to the instructions from the core module.

Referring to FIG. 4, the core modules in the host interface 111 and the flash interface 112 may process a command according to a service request from the host system (S110), and when the command is processed, the core modules in the host interface 111 may check the memory according to a predetermined period to check whether there is a service request or a command that needs to be processed (S120). In one or more examples, the memory may include a static random access memory (SRAM) or a tightly-coupled memory (TCM) in the controller 110.

In one or more embodiments, when there is a request or a command in the memory that needs to be processed, the core module may process the remaining command. However, when there is no request or no command that needs to be processed in the memory (S130), the core module may instruct the clock controller to supply an idle clock to the slave (S140). In one or more embodiments, the clock controller may be an IP module with a clock control function. When the core module instructs the clock controller to switch a state of a slave of a module or core module in a flash group including the core module to an idle state, the clock controller may supply a predetermined idle clock to each module. For example, the clock controller may instruct the clock generator to supply an idle clock to each module in a flash group.

Referring to FIG. 3 and FIG. 5, the core module of the host interface 111 may instruct the clock controller to supply idle clocks to IP module #1 and IP module #2 of the flash interface 112 when there are no commands in the memory that need to be processed. In addition, the core module of the second layer of the flash interface 112 may instruct the clock controller to supply idle clocks to IP module #3 and IP module #4 of the third layer when there are no commands that need to be processed in the memory.

In one or more embodiments, information about the idle clock level of each slave may be previously stored in the core module. In this case, the core may instruct the clock controller of the level of the idle clock to be supplied to the slave, and the clock controller may transmit the instructed level of clock to the slave. For example, the core module in the flash interface 112 of FIG. 3 may instruct the clock controller to supply an idle clock of level 1 to IP module #3 and an idle clock of level 2 to IP module #4. Thereafter, the clock controller may supply an idle clock of level 1 to IP module #3 and an idle clock of level 2 to IP module #4 according to the instruction of the core module.

In one or more examples, information about the idle clock level of each slave may be pre-registered in the clock controller. In this case, the core module may instruct the clock controller to supply an idle clock to the slave according to pre-stored information to each slave. For example, the core module in the flash interface 112 of FIG. 3 may instruct the clock controller to supply idle clocks to IP module #3 and IP module #4. Thereafter, the clock controller may supply an idle clock of level 1 to IP module #3 and an idle clock of level 2 to IP module #4 according to the information pre-registered in the clock controller.

Figure 6:
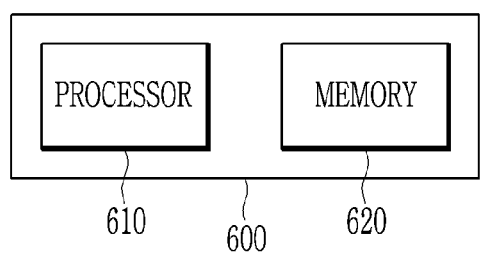
FIG. 6 illustrates a block diagram of a controller of a storage system according to one or more embodiments.

FIG. 6 illustrates a block diagram of a controller of a storage system according to one or more embodiments.

Referring to FIG. 6, a controller 600 of the storage system includes a processor 610 and a memory 620. The memory 620 may be connected to the processor 610 and may store various information for driving the processor 610 or at least one program executed by the processor 610.

The processor 610 may implement functions, processes, or methods proposed in one or more embodiments. Operations of the controller 600 according to one or more embodiments may be implemented by the processor 610.

In one or more embodiments of the present disclosure, the memory 620 may be disposed inside or outside the processor, and the memory may be coupled to the processor through various known elements. The memory is a volatile or non-volatile storage medium in various forms, and may include, for example, a read-only memory (ROM) or a random access memory (RAM).

In some embodiments, each constituent element, module, or unit represented as a block in FIG. 1 to FIG. 4 may be implemented as a variable number of hardware, software, and/or firmware structures that execute each function described above, depending on one or more embodiments. For example, at least one constituent element, module, or unit may include various hardware constituent elements including a digital circuit, a programmable or non-programmable logic device or an array, an application specific integrated circuit (ASIC), or other circuits that use digital circuit structures such as a memory, a processor, a logic circuit, and a look-up table, which may execute each function under the control of one or more microprocessors or other control devices. In addition, at least one constituent element, module, or unit may include one or more executable instruction words for performing a specific logic function, and may be executed by one or more microprocessors or other control devices. In addition, at least one constituent element, module, or unit may include a processor such as a CPU or microprocessor that performs each function, or may be implemented by a processor. Functional features of some embodiments may be implemented as an algorithm running on one or more processors.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A controller of a storage system, comprising
a plurality of modules including an intellectual property (IP) module and a core module,
wherein, based on the IP module operating as a master for a first module of the plurality of modules, an idle clock of the first module is a first clock,
wherein based on the core module operating as a master for a second module of the plurality of modules, an idle clock of the second module is a second clock,
wherein a clock frequency of the first clock is greater than zero and smaller than an active clock frequency, and
wherein a clock frequency of the second clock is zero.

2. The controller of claim 1, wherein the clock frequency of the first clock is determined depending on a power limit of the storage system based on the storage system being in an idle state.

3. The controller of claim 1, wherein based on the core module and the IP module operating as the master of the first module, the idle clock of the first module is the first clock.

4. The controller of claim 3, wherein:
each module of the plurality of modules is in a respective layer of a plurality of layers in a flash interface, the IP module is in a first layer of the plurality of layers, the core module is in a second layer of the plurality of layers, and the first module is in a third layer of the plurality of layers; and
the first layer is an upper hierarchical layer of the second layer, and the second layer is an upper hierarchical layer of the third layer.

5. The controller of claim 3, wherein:
each module of the plurality of modules is in a respective layer of a plurality of layers in a flash interface, the IP module and the core module are in a first layer of the plurality of layers, and the first module is in a second layer of the plurality of layers; and
the first layer is an upper hierarchical layer of the second layer.

6. The controller of claim 1, wherein each module of the plurality of modules is in a respective layer of a plurality of layers in a flash interface, the IP module is in a first layer of the plurality of layers, and the first module of the plurality of modules is in a lower hierarchical layer of the first layer of the plurality of layers.

7. The controller of claim 1, wherein the IP module is a module of a host interface, and the first module is a module of a flash interface.

8. The controller of claim 1, wherein the core module instructs a clock controller to supply a respective idle clock of different levels to a slave module of the core module based on a determination that there are no commands to be processed in a memory in the storage system.

9. The controller of claim 1, wherein the first module and the second module are in one flash group, and the flash group is mapped to at least one memory device.

10. A storage system comprising:
a controller; and
a plurality of memory devices,
wherein the controller is configured to control the plurality of memory devices according to a service request from a host system, and
wherein the controller is further configured, when converting a plurality of modules in a first flash group of a plurality of flash groups, each mapped to a respective memory device of the plurality of memory devices, to an idle state, to change a first idle clock of a first module and a second idle clock of a second module of the plurality of modules to different clock levels.

11. The storage system of claim 10, wherein the controller is further configured to, according to the service request, convert the first flash group into an active state and maintain a second flash group of the plurality of flash groups in an idle state.

12. The storage system of claim 11, wherein:
the controller is configured to supply a clock having a first clock frequency to the first module, and supply a clock having a second clock frequency to the second module; and
the first clock frequency is zero, and the second clock frequency is greater than zero and smaller than a clock frequency of an operation clock frequency of a module of the plurality of modules in the active state.

13. The storage system of claim 10, wherein a clock frequency of a second clock supplied to the second module is determined according to a power limit based on the storage system being in an idle state.

14. The storage system of claim 10, wherein based on one IP module of the plurality of modules operating as a master for the second module, an idle clock frequency of the second module is greater than 0 and smaller than a clock frequency of an operation clock of a module of the plurality of modules in an active state.

15. The storage system of claim 14, wherein each module of the plurality of modules is in a respective layer of a plurality of layers in a flash interface, the IP module is in a first layer of the plurality of layers, and the first module and the second module are in a lower hierarchical layer of the first layer of the plurality of layers.

16. The storage system of claim 14, wherein the IP module is a module of a host interface, and the second module is a module of a flash interface.

17. The storage system of claim 10, wherein based on a core module and an IP module of the plurality of modules operating as a master of the second module, a clock frequency of an idle clock of the second module is greater than 0 and smaller than a clock frequency of an operation clock frequency of a module of the plurality of modules in an active state.

18. The storage system of claim 17, wherein:
each module of the plurality of modules is in a respective layer of a plurality of layers in a flash interface, the IP module and the core module are in a first layer of the plurality of layers, and the first module and the second module are in a second layer of the plurality of layers; and
the first layer is an upper hierarchical layer of the second layer.

* * * * *